(12) United States Patent
Okamoto (10) Patent No.: US 10,124,538 B2
(45) Date of Patent: Nov. 13, 2018

(54) THREE-DIMENSIONAL MODELING APPARATUS, MANUFACTURING METHOD AND COMPUTER PROGRAM

(71) Applicant: SEIKO EPSON CORPORATION, Tokyo (JP)

(72) Inventor: Eiji Okamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 290 days.

(21) Appl. No.: 15/044,438

(22) Filed: Feb. 16, 2016

(65) Prior Publication Data

US 2016/0257071 A1    Sep. 8, 2016

(30) Foreign Application Priority Data

Mar. 3, 2015   (JP) .................................. 2015-041031

(51) Int. Cl.
| | |
|---|---|
| *B29C 64/112* | (2017.01) |
| *B29C 64/165* | (2017.01) |
| *B29C 64/20* | (2017.01) |
| *B33Y 10/00* | (2015.01) |
| *B33Y 30/00* | (2015.01) |
| *B33Y 50/02* | (2015.01) |
| *B29C 64/393* | (2017.01) |
| *B29C 67/00* | (2017.01) |

(Continued)

(52) U.S. Cl.
CPC ........ *B29C 67/0081* (2013.01); *B29C 64/112* (2017.08); *B29C 64/165* (2017.08); *B29K 2103/00* (2013.01); *B29K 2105/0032* (2013.01); *B29K 2105/0058* (2013.01); *B29K 2105/251* (2013.01); *B29K 2995/0021* (2013.01); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 6,007,318 A | 12/1999 | Russell et al. | |
| 6,165,406 A * | 12/2000 | Jang .................. | G05B 19/4099 264/308 |
| 7,300,613 B2 | 11/2007 | Sano et al. | |

(Continued)

FOREIGN PATENT DOCUMENTS

| | | |
|---|---|---|
| JP | 2001-150556 A | 6/2001 |
| JP | 2004-230895 A | 8/2004 |

(Continued)

*Primary Examiner* — Mary Lynn F Theisen (57) ABSTRACT

A three-dimensional modeling apparatus is provided with a head unit for modeling an object by discharging a liquid into each unit grille that is defined in accordance with modeling resolutions of a cross section body in X and Y directions and a lamination interval in a Z direction, and a control unit for controlling the head unit. The unit grille has a plurality of sub unit grilles aligned in the Z direction.
In the case where a designated amount of one of the plurality of types of chromatic liquids is discharged into each of the sub unit grilles by controlling the head unit and the spatial volume of the sub unit grille is not filled, the control unit causes the achromatic liquid to be discharged into the sub unit grille in addition to the chromatic liquid so as to fill the spatial volume of the unit grille.

8 Claims, 9 Drawing Sheets

(51) Int. Cl.
    *B29K 103/00*    (2006.01)
    *B29K 105/00*    (2006.01)

(56) References Cited

U.S. PATENT DOCUMENTS

| | | | |
|---|---|---|---|
| 7,497,977 | B2 | 3/2009 | Nelsen et al. |
| 2004/0159978 | A1 | 8/2004 | Neilsen et al. |
| 2004/0222549 | A1 | 11/2004 | Sano et al. |
| 2005/0001356 | A1 | 1/2005 | Tochimoto et al. |
| 2007/0007698 | A1 | 1/2007 | Sano |
| 2010/0156971 | A1 | 6/2010 | Ikeda et al. |
| 2015/0352783 | A1* | 12/2015 | Snyder ................ B29C 67/0059 264/132 |
| 2016/0151969 | A1* | 6/2016 | Utsunomiya ....... B29C 67/0059 264/255 |
| 2016/0243761 | A1* | 8/2016 | Okamoto ............ B29C 67/0059 |
| 2016/0263825 | A1* | 9/2016 | Wada .................. B29C 67/0059 |
| 2016/0339643 | A1* | 11/2016 | Dikovsky ............ B41M 5/0082 |
| 2017/0334130 | A1* | 11/2017 | Kritchman ............ B29C 64/124 |
| 2018/0001546 | A1* | 1/2018 | Yamazaki ............. B29C 64/112 |
| 2018/0011475 | A1* | 1/2018 | Donovan ........... G05B 19/4099 |

FOREIGN PATENT DOCUMENTS

| | | |
|---|---|---|
| JP | 2005-067138 A | 3/2005 |
| JP | 2005-088432 A | 4/2005 |
| JP | 2010-058519 A | 3/2010 |
| JP | 2010-149326 A | 7/2010 |
| JP | 2011-073163 A | 4/2011 |

\* cited by examiner

| CHROMATIC INK | CLEAR INK |
|---|---|
| NONE (00) | LARGE (11) |
| SMALL (01) | INTERMEDIATE (10) |
| INTERMEDIATE (10) | SMALL (01) |
| LARGE (11) | NONE (00) |

| NUMBER OF UNIT GRILLES | DISCHARGE AMOUNT 4, 8, 12 pl | |
|---|---|---|
| | NUMBER OF GRADATIONS FOR EACH COLOR | NUMBER OF EXPRESSED COLORS |
| 1 | 4 | 64 |
| 2 | 7 | 343 |
| 3 | 10 | 1000 |

FIG. 7

| NUMBER OF UNIT GRILLES | DISCHARGE AMOUNT 5, 8, 13 pl | |
|---|---|---|
| | NUMBER OF GRADATIONS FOR EACH COLOR | NUMBER OF EXPRESSED COLORS |
| 1 | 4 | 64 |
| 2 | 9 | 729 |
| 3 | 15 | 3375 |

|  | CHROMATIC INK | CLEAR INK |
|---|---|---|
| SMALL | 4.0 pl | 3.7 pl |
| INTERMEDIATE | 8.0 pl | 7.4 pl |
| LARGE | 12.0 pl | 11.0 pl |
| CURE SHRINKAGE RATE | 16 % | 8 % |
| VOLUME AFTER CURING (LARGE) | 10.1 pl | 10.1 pl |

FIG.10

THREE-DIMENSIONAL MODELING APPARATUS, MANUFACTURING METHOD AND COMPUTER PROGRAM

BACKGROUND

1. Technical Field

The present invention relates to a three-dimensional modeling apparatus.

2. Related Art

In recent years, three-dimensional modeling apparatuses that adopt an inkjet technique have been attracting attention. With three-dimensional modeling apparatuses that adopt an inkjet technique, a three-dimensional object is modeled by performing, over a number of layers in the height direction (Z direction), a step of discharging a liquid having curability and forming a cross section body for one layer that lies in the horizontal direction (XY directions). For example, with a three-dimensional modeling apparatus described in JP-A-2011-73163, the color intensity is expressed by superimposing layers in which a peripheral portion is colored and layers in which a peripheral portion is not colored.

JP-A-2011-73163, JP-A-2001-150556, JP-A-2005-67138, and JP-A-2010-58519 are examples of related art.

SUMMARY

However, with the technique described in JP-A-2011-73163, only one color can be expressed for each layer, and therefore there is the possibility that, when observed from outside, the apparent resolution deteriorates to lower than the actual modeling resolution, when expressing multilevel gradations. Therefore, there are demands for a technique that makes it possible to suppress deterioration of the apparent resolution in a technique for modeling a colored three-dimensional object by discharging a liquid.

An advantage of some aspects of the invention is to solve at least some of the above-described problems, and the invention can be achieved as the following modes.

(1) According to one mode of the invention, a three-dimensional modeling apparatus for modeling a three-dimensional object by laminating a plurality of cross section bodies in a Z direction is provided. This three-dimensional modeling apparatus includes: a head unit that models the object by discharging a liquid, which is to be a material of the object, into each unit grille that is defined in accordance with a modeling resolution of the cross section body in an X direction, a modeling resolution of the cross section body in a Y direction, and a lamination interval of the cross section body in the Z direction; and a control unit that controls the head unit. The unit grille has a plurality of sub unit grilles aligned in the Z direction, the head unit is configured to individually discharge, into each of the sub unit grilles, an achromatic liquid and a plurality of types of chromatic liquids in designated amounts, and in the case where a designated amount of one of the plurality of types of chromatic liquids is discharged into each of the sub unit grilles by controlling the head unit and the spatial volume of the sub unit grille is not filled, the control unit causes the achromatic liquid to be discharged into the sub unit grille in addition to the chromatic liquid so as to fill the spatial volume of the sub unit grille. With the three-dimensional modeling apparatus of such a mode, it is possible to adjust the amount of the chromatic liquid to be discharged into sub unit grilles that are smaller units than unit grilles that depend on the modeling resolution, and thus when modeling a colored three-dimensional object, it is possible to suppress deterioration of the apparent resolution of the three-dimensional object. In addition, in the above mode, in the case where the spatial volume of a sub unit grille is not filled by the amount of the chromatic liquid discharged into the sub unit grille, the remaining spatial volume of the sub unit grille is filled with the achromatic liquid. Therefore, the volumes of the sub unit grilles are uniformized, and the volumes of the unit grilles are also uniformized. Therefore, the three-dimensional object can be precisely modeled.

(2) In the three-dimensional modeling apparatus of the above mode, the control unit may express color gradation represented by one of the plurality of types of chromatic liquids by changing the number of unit grilles into which the one chromatic liquid is to be discharged, with respect to a unit grille column that is constituted by a plurality of unit grilles aligned in a direction inwardly from a surface of the object. With the three-dimensional modeling apparatus of such a mode, the object is also colored in the depth direction, whereby it is possible to change the color intensity observed from outside of the object. Therefore, it is possible to increase the number of colors that can be expressed.

(3) In the three-dimensional modeling apparatus of the above mode, in the case where a plurality of the unit grilles into which the one chromatic liquid is to be discharged exist in the unit grille column, the control unit may discharge the one chromatic liquid into the sub unit grilles whose positions in the Z direction are the same in the plurality of unit grilles, and may discharge the one chromatic liquid into each of the sub unit grilles in the unit grille column such that the one chromatic liquid is arranged on the surface side relative to the achromatic liquid. With the three-dimensional modeling apparatus of such a mode, the color intensity of colored portions can be precisely expressed.

(4) In the three-dimensional modeling apparatus of the above mode, the color of the achromatic liquid may be white. With the three-dimensional modeling apparatus of such a mode, the color intensity of colored portions can be more accurately expressed.

(5) In the three-dimensional modeling apparatus of the above mode, the head unit may be configured to discharge each of the plurality of types of chromatic liquids in at least a first amount and a second amount that is larger than the first amount, and the second amount does not need to be a multiple of the first amount. With the three-dimensional modeling apparatus of such a mode, various amounts can be represented by combining the first amount and the second amount, thus making it possible to increase the number of gradations that can be expressed.

(6) In the three-dimensional modeling apparatus of the above mode, the amount of the achromatic liquid that is discharged from the head unit into the sub unit grilles may be adjusted in advance in accordance with the difference between a cure shrinkage rate of the achromatic liquid and a cure shrinkage rate of each of the chromatic liquids. With the three-dimensional modeling apparatus of such a mode, the modeling accuracy of a three-dimensional object can be enhanced.

The invention can also be achieved in various modes other than modes as a three-dimensional modeling apparatus. For example, the invention can be achieved as a method for a three-dimensional modeling apparatus to manufacture a three-dimensional object, a computer program for modeling a three-dimensional object by causing a computer to control a three-dimensional modeling apparatus, a non-transitory tangible recording medium on which the computer program is recorded, or the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
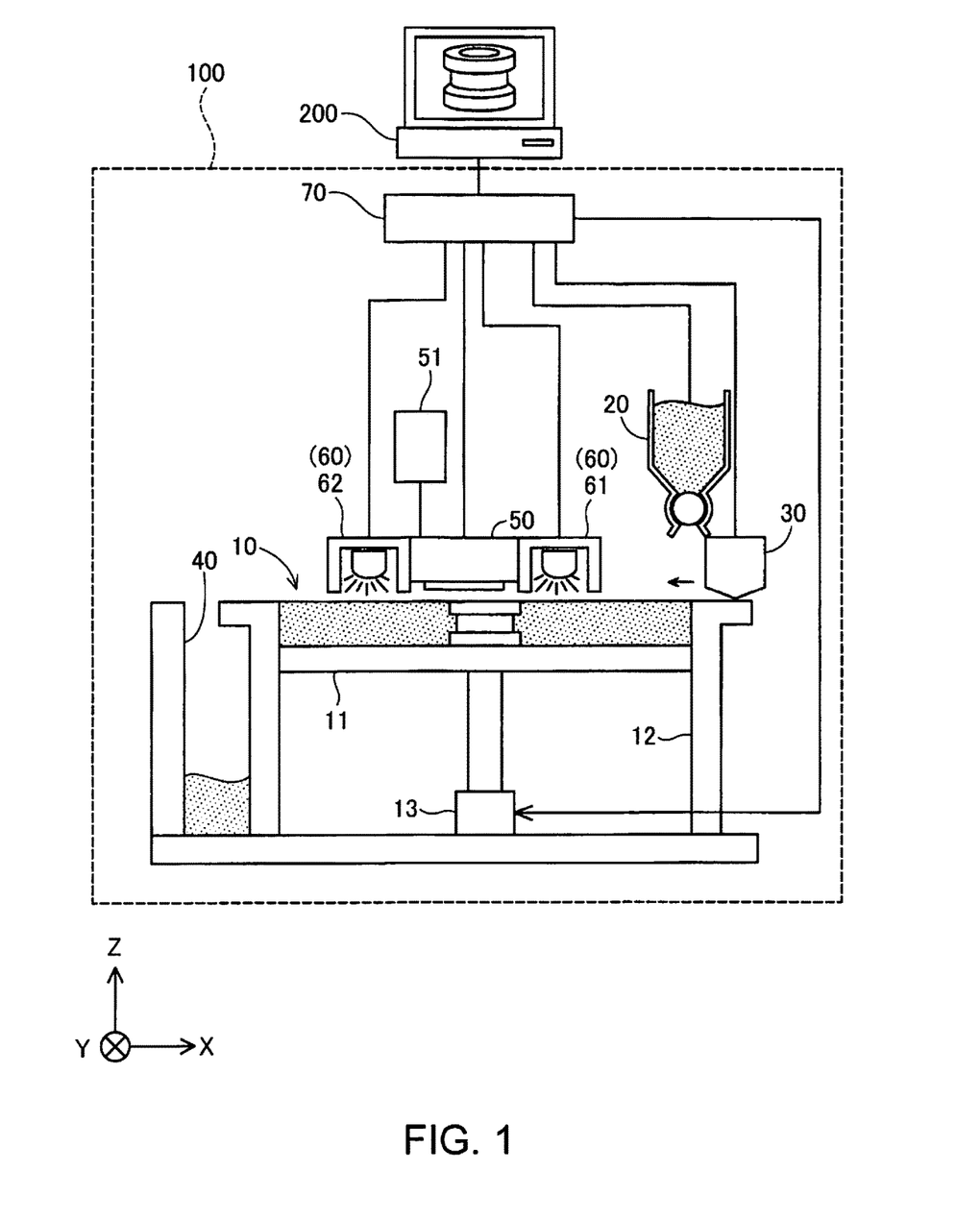
FIG. 1 is an explanatory diagram showing a schematic configuration of a three-dimensional modeling apparatus as a first embodiment.

FIG. 1 is an explanatory diagram showing the schematic configuration of a three-dimensional modeling apparatus as a first embodiment of the invention. A three-dimensional modeling apparatus 100 is provided with a modeling unit 10, a powder supply unit 20, a flattening mechanism 30, a powder collecting unit 40, a head unit 50, a curing energy applying unit 60, and a control unit 70. A computer 200 is connected to the control unit 70. The three-dimensional modeling apparatus 100 and the computer 200 can be collectively regarded as a "three-dimensional modeling apparatus" in a broad sense. In FIG. 1, an X direction, a Y direction and a Z direction that intersect one another orthogonally are shown. The Z direction is a direction along a vertical direction, and the X direction is a direction along a horizontal direction. The Y direction is a direction perpendicular to the Z direction and the X direction.

The modeling unit 10 is a tank-shaped structure in which a three-dimensional object is modeled. The modeling unit 10 is provided with a modeling stage 11 that is flat and lies in the XY directions, a frame body 12 surrounding the periphery of the modeling stage 11 and erect in the Z direction, and an actuator 13 for moving the modeling stage 11 in the Z direction. The modeling stage 11 moves in the Z direction in the frame body 12 by the control unit 70 controlling the operations of the actuator 13.

The powder supply unit 20 is an apparatus for supplying powder into the modeling unit 10. The powder supply unit 20 is constituted by a hopper or a dispenser, for example.

The flattening mechanism 30 is a mechanism for flattening the powder supplied into the modeling unit 10 or on the frame body 12 and forming a powder layer on the modeling stage 11 by moving over the upper surface of the modeling unit 10 in the horizontal direction (XY directions). The flattening mechanism 30 is constituted by a squeegee or a roller, for example. The powder pushed out from the modeling unit 10 by the flattening mechanism 30 is discharged into the powder collecting unit 40 provided adjacent to the modeling unit 10.

The three-dimensional modeling apparatus 100 in the first embodiment uses a liquid having curability (hereinafter, referred to as "curable liquid") and the above powder as materials of a three-dimensional object. A mixture of a liquid resin material that is mainly composed of monomers and oligomers to which monomers are bonded, and a polymerization initiator that enters an excited state when irradiated with ultraviolet light and acts on the monomers or the oligomers so as to start polymerization is used as a curable liquid. In addition, as the monomers of the resin material, relatively low molecular weight monomers are selected, and furthermore, the number of monomers included in one oligomer of the resin material is adjusted to be about a few molecules such that the curable liquid has a low viscosity that allows droplets to be discharged from the head unit 50. This curable liquid has a property of quickly curing and becoming a solid as a result of the monomers polymerizing with one another and growing into oligomers and the oligomers also polymerizing with one another in places, when the curable liquid is irradiated with ultraviolet light and the polymerization initiator enters an excited state.

In this embodiment, powder particles on the surface of which a polymerization initiator of a different type from that contained in the curable liquid is attached are used as the powder. The polymerization initiator attached to the surface of the powder particles has a property of acting on the monomers or the oligomers so as to start polymerization when coming into contact with the curable liquid. Therefore, when the curable liquid is supplied to the powder in the modeling unit 10, the curable liquid permeates into the powder, and cures as a result of coming into contact with the polymerization initiator on the surface of the powder particles. As a result, in a portion onto which the curable liquid is discharged, powder particles are coupled to one another by the curable liquid that has cured. Note that in the case of using, as the powder, powder particles having a polymerization initiator attached to the surface thereof, a curable liquid that does not contain a polymerization initiator can also be used.

The head unit 50 is an apparatus that receives supply of the above-described curable liquid from a tank 51 connected to the head unit 50 and discharges, in the Z direction, the curable liquid onto the powder layer in the modeling unit 10. In this embodiment, the head unit 50 can discharge, as the curable liquid, achromatic ink and a plurality of types of chromatic ink. In this embodiment, the head unit 50 can discharge clear (CL) ink and white (W) ink as the achromatic ink. In addition, the head unit 50 can discharge cyan (C) ink, magenta (M) ink, and yellow (Y) ink as the chromatic ink. Note that the colors of the ink discharged by the head unit 50 are not limited thereto. The head unit 50 can move in the X direction and the Y direction with respect to a three-dimensional object modeled in the modeling unit 10. In addition, the head unit 50 can move in the Z direction relative to the three-dimensional object, by the modeling stage 11 inside of the modeling unit 10 moving in the Z direction.

The head unit 50 of this embodiment is a so-called piezoelectric drive type droplet discharging head. The piezoelectric drive type droplet discharge head can discharge, as droplets, a curable liquid of a volume corresponding to a reduced volume of a pressure chamber, by filling the pressure chamber having a minute nozzle hole with the curable liquid and flexing the sidewall of the pressure chamber using a piezoelectric element. The control unit 70 that is described later can adjust the amount of the curable liquid per droplet to be discharged from the head unit 50 by controlling a voltage waveform that is applied to the piezoelectric element.

The curing energy applying unit 60 is an apparatus for applying energy for curing the curable liquid discharged from the head unit 50. In this embodiment, the curing energy applying unit 60 is constituted by a main curing light emitting apparatus 61 and a provisional curing light emitting apparatus 62 that are arranged so as to sandwich the head unit 50 in the X direction. When the head unit 50 is moved, the curing energy applying unit 60 also moves with the head unit 50. Ultraviolet rays as curing energy for curing the curable liquid are emitted from the main curing light emitting apparatus 61 and the provisional curing light emitting apparatus 62. The provisional curing light emitting apparatus 62 is used for performing provisional curing to fix the discharged curable liquid at the landing position thereof. The main curing light emitting apparatus 61 is used for completely curing the curable liquid after provisional curing. The energy of the ultraviolet rays emitted from the provisional curing light emitting apparatus 62 are 20 to 30% of the energy of the ultraviolet rays emitted from the main curing light emitting apparatus 61, for example.

The control unit 70 is provided with a CPU and a memory. The CPU has a function of modeling a three-dimensional object by controlling the actuator 13, the powder supply unit 20, the flattening mechanism 30, the head unit 50 and the curing energy applying unit 60 by loading a computer program stored in the memory or a recording medium to the memory and executing the program. This function, which will be described in detail later, includes a function of, in the case where a designated amount of one of a plurality of types of chromatic ink is discharged into each of sub unit grilles SU (see FIGS. 3A to 3G) in a unit grille (see FIGS. 3A to 3G) that is the smallest unit of the modeling resolution by controlling the head unit 50 and the spatial volume of the sub unit grille SU is not filled, causing achromatic ink to be discharged into the sub unit grille SU in addition to the chromatic ink, such that the spatial volume of the sub unit grille SU is filled. The functions of the control unit 70 may be realized by an electronic circuit.

A method for modeling (manufacturing) a three-dimensional object using the three-dimensional modeling apparatus 100 will be briefly described. The computer 200 first slices polygon data indicating the shape of the three-dimensional object in accordance with a modeling resolution (lamination pitch) in the Z direction, and generates a plurality of cross section data in the XY directions. This cross section data has a predetermined modeling resolution in the X direction and the Y direction, and is represented by two-dimensional bitmap data in which a gradation value is stored for each element. The gradation value stored in each element represents the amount of a curable liquid to be discharged at an XY coordinate corresponding to the element. That is, in this embodiment, bitmap data designates, for the control unit 70 of the three-dimensional modeling apparatus 100, coordinates at which the curable liquid is to be discharged and the amount of the curable liquid to be discharged.

Upon acquiring the cross section data from the computer 200, the control unit 70 of the three-dimensional modeling apparatus 100 forms a powder layer in the modeling unit 10 by controlling the powder supply unit 20 and the flattening mechanism 30. The control unit 70 then drives the head unit 50 so as to discharge the curable liquid onto the powder layer in accordance with the cross section data, and subsequently controls the curing energy applying unit 60 so as to emit ultraviolet light toward the discharged curable liquid, and performs provisional curing and main curing. The curable liquid then cures due to the ultraviolet light, powder particles are coupled to one another, and a cross section body corresponding to cross section data for one layer is formed in the modeling unit 10. When the cross section body for one layer has been formed in this manner, the control unit 70 drives the actuator 13 so as to lower the modeling stage 11 in the Z direction by/for a lamination pitch that is in accordance with a modeling resolution in the Z direction. When the modeling stage 11 has been lowered, the control unit 70 forms a new powder layer on the cross section body that has already been formed on the modeling stage 11. When the new powder layer has been formed, the control unit 70 receives the next cross section data from the computer 200 and forms a new cross section body by discharging the curable liquid onto the new powder layer and emitting ultraviolet light. In this manner, on receiving cross section data for each layer from the computer 200, the control unit 70 controls the actuator 13, the powder supply unit 20, the flattening mechanism 30, the head unit 50, and the curing energy applying unit 60 so as to form a cross section body for each layer, and consecutively laminates cross section bodies, thereby modeling a three-dimensional object.

Figure 2:
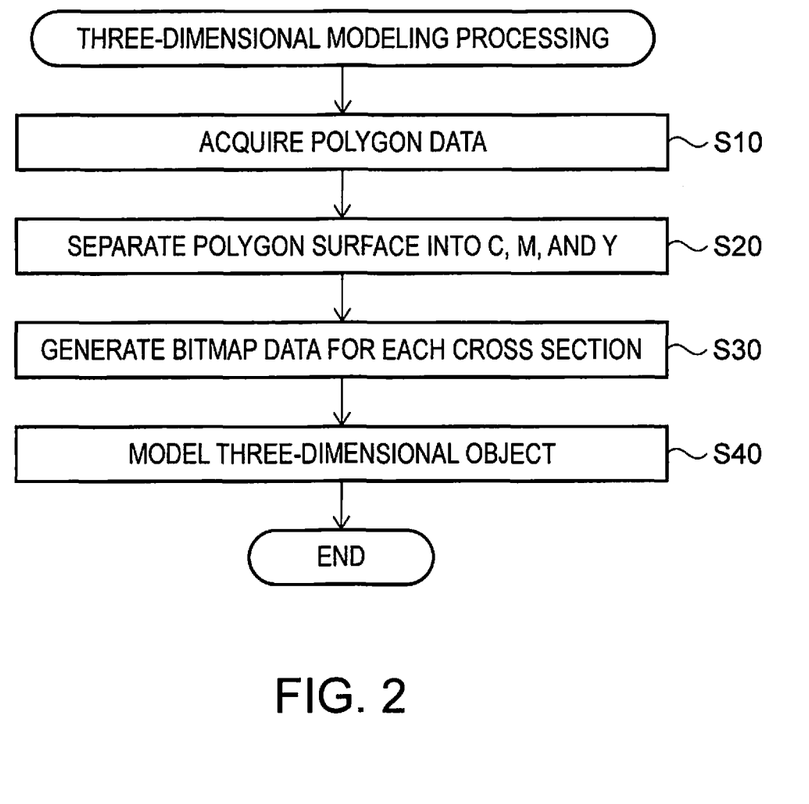
FIG. 2 is a flowchart of three-dimensional modeling processing in the first embodiment.

FIG. 2 is a specific flowchart of three-dimensional modeling processing executed in this embodiment. In this embodiment, the computer 200 first acquires polygon data indicating the shape of a three-dimensional object from an application program or the like being executed on a recording medium, a network or the computer 200 (step S10). When the polygon data is acquired, the computer 200 performs color separation on the images on the surfaces of polygons that are represented by the polygon data into the colors of C, M and Y (step S20).

When the images on the surfaces of the polygons are separated, subsequently, the computer 200 slices the polygon data in accordance with a modeling resolution in the Z direction, and generates bitmap data for each cross section (step S30). At this time, the computer 200 causes a value that represents a graduation value for each of the colors of C, M and Y to be stored at coordinates in each piece of the cross section data that correspond to the outermost periphery of the object, based on the surface images of the polygons, and a value for discharging clear ink to be stored at coordinates inside the outermost periphery. Note that a value for discharging white ink may be stored at inner coordinates adjacent to coordinates for the outermost periphery to be colored. If white ink is arranged inside the outermost periphery, the ground color becomes white, and thereby the reproducibility of the applied color can be improved.

When the bitmap data has been generated for each cross section, the control unit 70 of the three-dimensional modeling apparatus 100 receives the bitmap data from the computer 200, controls the units such as the head unit 50 in accordance with the received bitmap data, and models the three-dimensional object by following the above-described procedure (step S40). As described above, the graduation value for each of the colors of C, M and Y is recorded at the coordinates of the outermost periphery of each cross section data, and the value for discharging clear ink is stored at coordinates other than the coordinates of the outermost periphery. Therefore, in step S40, an object whose inner portion is transparent and whose surface is colored is modeled. In step S40, the control unit 70 performs coloring in accordance with the following methods when coloring the unit grilles.

FIGS. 3A to 3G are diagrams for explaining a method for expressing a color in the first embodiment. In this embodiment, the head unit 50 models an object by discharging, into each unit grille UG, a curable liquid that is to be the material of the three-dimensional object. The unit grille UG is a grille having a minimum volume that depends on the modeling resolutions of a cross section body in the X direction and the Y direction, and the lamination interval of the cross section body in the Z direction. That is to say, the unit grille UG is the smallest unit of modeling resolution. One unit grille UG corresponds to one coordinate of bitmap data. The unit grille is also referred to as a voxel. One unit grille UG has a plurality of sub unit grilles SU in accordance with the type of chromatic ink that can be discharged by the head unit 50. The sub unit grilles SU are also referred to as sub voxels. In this embodiment, the head unit 50 can discharge chromatic ink of three primary colors (C, M, and Y) in subtractive color mixing, and thus one unit grille UG has three sub unit grilles SU. These sub unit grilles SU are aligned in the Z direction. The head unit 50 can discharge, into each of the sub unit grilles SU, one ink out of C, M, Y, W, and CL in an amount designated by the control unit 70.

Figure 3A:
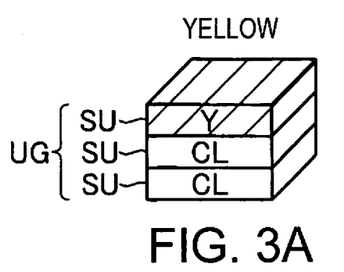
FIGS. 3A to 3G are diagrams for explaining a method for expressing a color in the first embodiment.
Figure 3B:
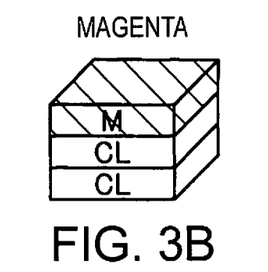
Figure 3C:
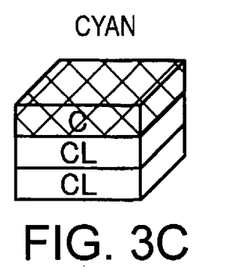
Figure 3D:
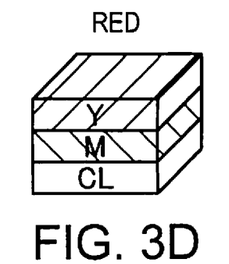
Figure 3E:
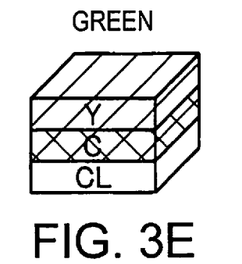
Figure 3F:
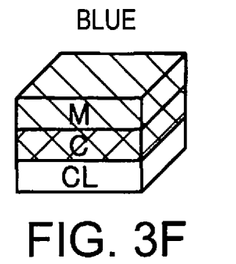
Figure 3G:
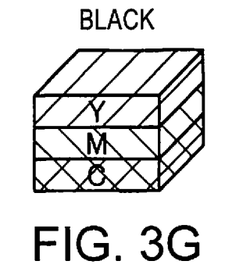

FIGS. 3A to 3C show examples in which one type of ink out of C, M, and Y has been discharged into a unit grille UG and one sub unit grille SU has been filled with the chromatic ink. In addition, FIGS. 3D to 3F show examples in which two types of ink out of C, M, and Y have been discharged into a unit grille UG and two sub unit grilles SU have been filled with the chromatic ink. FIG. 3G shows an example in which ink of all of C, M, and Y has been discharged into a unit grille UG and all three sub unit grilles SU have been filled with the chromatic ink. As shown in FIGS. 3A to 3F, clear ink (CL) has been discharged to fill a sub unit grille SU into which ink of any of C, M, or Y has not been discharged.

In this embodiment, in the case where chromatic ink of one out of C, M and Y is discharged into each of sub unit grilles SU and the spatial volume of the sub unit grille SU is not filled with the chromatic ink, the control unit 70 causes clear ink, which is achromatic ink, to be discharged into the sub unit grille SU in addition to the chromatic ink, such that the spatial volume of the sub unit grille SU is filled with both the chromatic ink and the achromatic ink. Therefore, the volumes of the sub unit grilles SU are uniformized and the volumes of the unit grilles UG are also uniformized. Note that in the case of this embodiment in which an object is modeled using powder, the spatial volume of a sub unit grille SU is a volume obtained by subtracting, from the volume of the sub unit grille SU, the volume of the powder included therein, and chromatic ink and achromatic ink are discharged so as to substantially fill the spatial volume.

Figure 4:
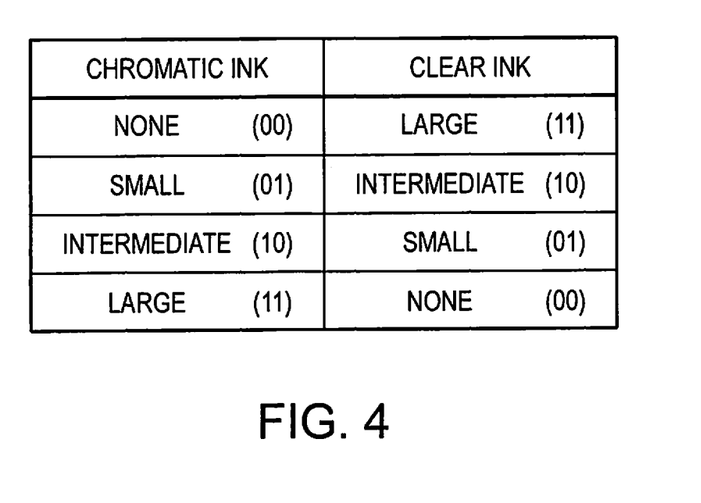
FIG. 4 is a diagram showing a relation between a discharge amount of chromatic ink and a discharge amount of clear ink.

FIG. 4 is a diagram showing the relation between a discharge amount of chromatic ink and a discharge amount of clear ink that are discharged for each of sub unit grilles. In this embodiment, the head unit 50 selects a discharge amount of chromatic ink per droplet from among four types, that is, "none (no discharge)", "small", "intermediate", and "large" in accordance with the size of the gradation value in bitmap data. Specifically, the control unit 70 controls the head unit 50 so as to discharge the chromatic ink in the following amounts: "zero" if the gradation value in the bitmap data that has been acquired from the computer 200 is larger than or equal to 0% and less than 25%, "small" if the gradation value is larger than or equal to 25% and less than 50%, "intermediate" if the gradation value is larger than or equal to 50% and less than 75%, and "large" if the gradation value is larger than or equal to 75% and less than 100%. That is, in this embodiment, for example, in the case where the images on original polygon surfaces are full color, when coloring a three-dimensional object, the number of gradations for each of the colors C, M and Y is four, and thus color subtraction is performed to obtain 64 colors in total. In this embodiment, this color subtraction processing is performed by the control unit 70, but may be performed in advance by the computer 200 when generating the bitmap data. In this embodiment, the head unit 50 discharges 4 pl of ink in the case where the discharge amount is "small", 8 pl in the case of "intermediate", and 12 pl in the case of "large". The amount of ink discharged in the case where the discharge amount of ink is "large" matches the capacity of one sub unit grille SU. In this embodiment, the discharge amount of ink of each color has four levels, but may have more detailed levels or broader levels in accordance with the ability of the head unit 50 to adjust the discharge amount.

When the discharge amount of the chromatic ink is selected based on the bitmap data as described above, the control unit 70 determines the amount of clear ink to be discharged into the sub unit grille SU into which the chromatic ink is to be discharged in accordance with the selected discharge amount of the chromatic ink. Specifically, the control unit 70 determines the discharge amount of the clear ink such that the total of the discharge amount of the chromatic ink and the discharge amount of the clear ink equals the "large" amount. Specifically, in this embodiment, since the total of "small" and "intermediate" equals "large" (4 pl+8 pl=12 pl), the amount of the clear ink is "large" in the case where the amount of the chromatic ink is "zero", the amount of the clear ink is "intermediate" in the case where the amount of the chromatic ink is "small", the amount of the clear ink is "small" in the case where the amount of the chromatic ink is "intermediate", and the amount of the clear ink is "zero" in the case where the amount of the chromatic ink is "large". If this relation is expressed with binary numbers such as an example in which "large" is "11", "intermediate" is "10", "small" is "01", and "zero" is "00", the amount of the clear ink is a value obtained by inverting a binary number representing the amount of the chromatic ink (=11—a binary number representing the amount of the chromatic ink). Therefore, even if the amount of clear ink is not designated in bitmap data, the control unit 70 can easily determine the amount of the clear ink based on the amount of chromatic ink if designated. Note that the control unit 70 may automatically select, from voltage waveforms to be applied to the head unit 50 in order to discharge chromatic ink, a voltage waveform for discharging clear ink corresponding to the voltage waveform and apply the selected voltage waveform without performing calculation based on binary numbers.

In the three-dimensional modeling apparatus 100 of this embodiment described above, a designated amount of chromatic ink of one of C, M, and Y is discharged into each of sub unit grilles SU that is a smaller unit than a unit grille UG that is the smallest unit of modeling resolution, and thus a color can be expressed by performing subtractive color mixing for the unit grilles UG. Therefore, it becomes possible to match a modeling resolution to an apparent resolution, thus greatly improving the apparent resolution compared to the case in which coloring of only one color out of C, M, and Y is performed for one unit grille UG and colors are expressed by area gradation.

In addition, in this embodiment, in the case where the spatial volume of a sub unit grille SU is not filled with the chromatic ink discharged into the sub unit grille SU, the remaining spatial volume of the sub unit grille SU is filled with clear ink, whereby the volumes of sub unit grilles SU can be uniformized. Therefore, the volumes of all the unit grilles UG are also uniformized, and as a result, it also becomes possible to enhance the modeling accuracy of the three-dimensional object that is finally modeled.

Note that in this embodiment, as described above, because the number of gradations is four for each of the colors of C, M, and Y, 64 colors per unit grille UG can be reproduced. In a three-dimensional object, there is little need for expressing a natural image or shading as in a two-dimensional image, and therefore even such a number of colors can sufficiently reproduce an image on the surface of the three-dimensional object in most cases.

B. Second Embodiment

In the above first embodiment, only the outermost periphery of the three-dimensional object is colored. On the other hand, in a second embodiment, coloring is performed from the outermost periphery of an object inwardly in the depth direction. The configuration of the three-dimensional modeling apparatus 100 in the second embodiment is the same as that of the first embodiment.

Figure 5:
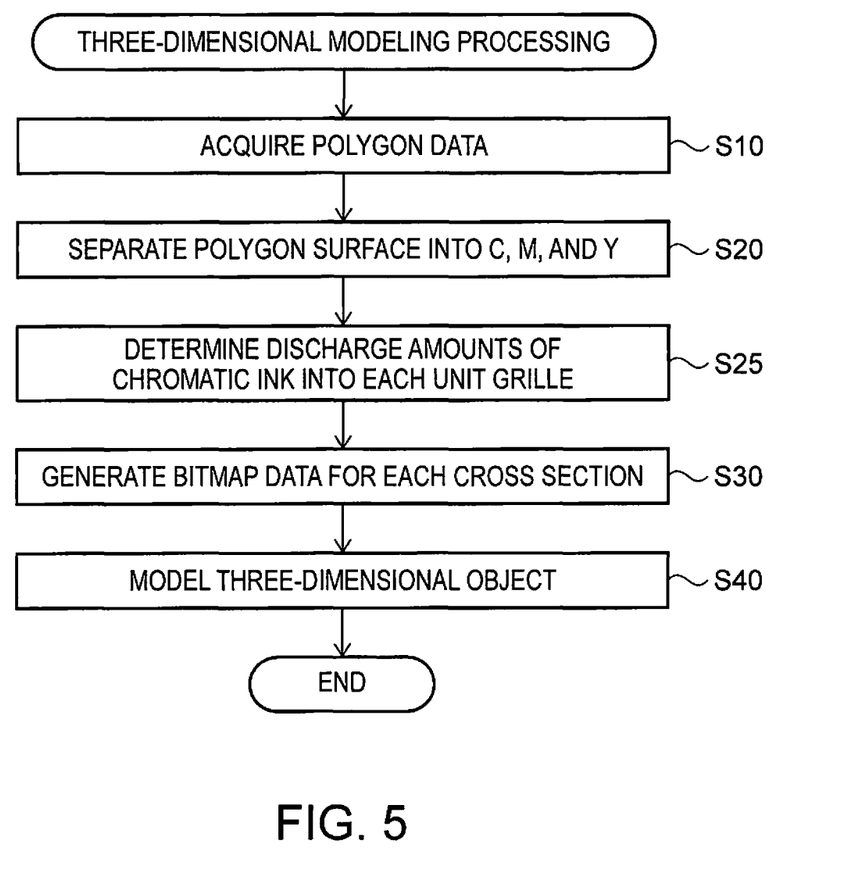
FIG. 5 is a flowchart of three-dimensional modeling processing in a second embodiment.

FIG. 5 is a flowchart of three-dimensional modeling processing in the second embodiment. In this flowchart, the same step numbers as those in FIG. 2 are given to steps having the same processing contents as those of the three-dimensional modeling processing in the first embodiment shown in FIG. 2.

Figure 6A:
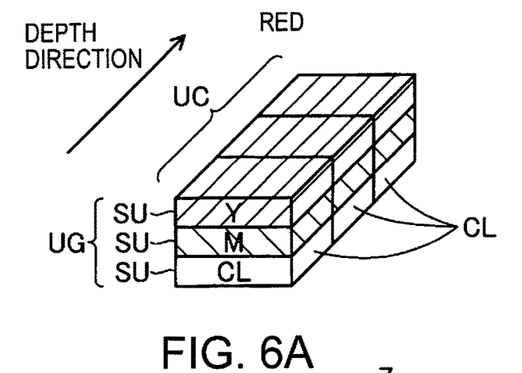
FIGS. 6A and 6B are diagrams showing a state of recording chromatic ink in a depth direction.
Figure 6B:
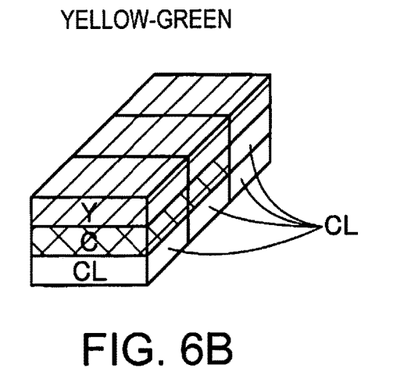

In the second embodiment, when the computer 200 first acquires polygon data (step S10), the image on the surface of each of the polygons is separated into C, M and Y, similarly to the first embodiment (step S20). Subsequently, the computer 200 determines the discharge amount of each of the types of chromatic ink for each of unit grilles UG in accordance with the gradation values for the colors (step S25). In this step S25, the computer 200 determines the discharge amount of chromatic ink to be discharged into each of those unit grilles UG in accordance with the gradation values of the colors in order to perform gradation expression using a plurality of unit grilles UG aligned in the depth direction along the XY directions of the three-dimensional object. Hereinafter, a plurality of unit grilles UG aligned in the depth direction from the surface of an object is referred to as a unit grille column UC (see FIG. 6). In this embodiment, the unit grille column UC is constituted by three adjacent unit grilles UG.

In the above step S25, for example, in the case where the gradation value is larger than or equal to 0% and less than 34%, the computer 200 selects a discharge amount of chromatic ink to be discharged into a unit grille UG on the outermost surface side from among "zero", "small", "intermediate", and "large" in accordance with the size of that gradation value. In addition, if the gradation value is larger than or equal to 34% and less than 67%, the discharge amount of chromatic ink to be discharged into the unit grille UG on the outermost surface side is "large", and the discharge amount of chromatic ink to be discharged into a second unit grille UG from the surface in the depth direction is selected from among "zero", "small", "intermediate", and "large" in accordance with the size of the gradation value. Furthermore, if the gradation value is larger than or equal to 67% and less than or equal to 100%, the discharge amounts of chromatic ink to be discharged into the unit grille UG on the outermost surface side and the second unit grille UG from the surface in the depth direction are both "large", and the discharge amount of chromatic ink to be discharged into a third unit grille UG from the surface in the depth direction is selected from among "zero", "small", "intermediate", and "large" in accordance with the size of gradation value. That is, in this embodiment, the discharge amounts of chromatic ink are selected for the three unit grilles UG aligned in the depth direction from among "zero", "small", "intermediate", and "large", and thus C, M, and Y each can be expressed in ten gradations. As a result, it becomes possible to express 1000 colors in total for all of C, M, and Y.

When the processing of step S25 is completed, the computer 200 generates bitmap data for each cross section based on the discharge amounts of chromatic ink of C, M, and Y for each of unit grilles UG determined in step S25 (step S30). In this embodiment, the discharge amount of chromatic ink, not the gradation value, is recorded in the bitmap data generated in this step S30. The control unit 70 of the three-dimensional modeling apparatus 100 then models a three-dimensional object at each cross section in accordance with the bitmap data generated by the computer 200 (step S40). In this step S40, in the case where the spatial volume of each of the sub unit grilles SU is not filled with the chromatic ink, the control unit 70 causes the remaining spatial volume to be filled with clear ink, similarly to the first embodiment.

FIGS. 6A and 6B are diagrams showing chromatic ink having been recorded in the depth direction. For example, in an example shown in FIG. 6A, yellow ink and magenta ink have been recorded for three unit grilles UG in the depth direction, and thereby a red color is expressed. In addition, in FIG. 6B, yellow ink has been recorded for three unit grilles UG in the depth direction, cyan ink has been recorded for two unit grilles UG, and thereby a yellow-green color is expressed. Clear ink has been discharged into sub unit grilles SU into which chromatic ink has not been discharged.

As shown in FIGS. 6A and 6B, in this embodiment, in the case where a plurality of unit grilles UG, into which chromatic ink is to be discharged, exist in a unit grille column UC, the control unit 70 causes the chromatic ink to be discharged into sub unit grilles SU whose positions in the Z direction are the same, and causes the chromatic ink to be discharged into the sub unit grilles SU such that in the unit grille column UC, the chromatic ink is arranged on the surface side relative to clear ink. Thereby, the gradation of a colored portion can be accurately expressed. Note that it is also possible to record a plurality of types of chromatic ink in the depth direction so as to sandwich clear ink between chromatic ink. Here, causing the chromatic ink to be discharged such that the positions thereof in the Z direction are the same involves discharging the chromatic ink into a plurality of unit grilles UG in the same order. For example, magenta ink (M) is discharged second in FIG. 6A, and cyan ink (C) is discharged second in FIG. 6B, and their positions in the Z direction are the same.

According to the second embodiment described above, not only is a three-dimensional object colored in units of a sub unit grille SU that is a smaller unit than a unit grille UG, but the object is also colored in the depth direction thereof, whereby the color intensity observed from outside of the object can be expressed in more detail. Therefore, the number of colors that can be expressed can be significantly increased. As a result, not only does an apparent resolution improve, but color reproducibility can be improved. In addition, in this embodiment as well, the spatial volume of a sub unit grille SU that has not been filled with chromatic ink is filled with clear ink, and thus a three-dimensional object can be precisely modeled.

Note that in the second embodiment, the achromatic ink arranged inside the chromatic ink in the depth direction may be white ink, instead of clear ink. If the achromatic ink arranged on the inner side is white ink, the ground color can be white, and thus gradation expression using the chromatic ink can be accurately performed.

In addition, in the second embodiment, the discharge amounts of chromatic ink of C, M, and Y for a plurality of unit grilles UG aligned in the depth direction are determined when the computer 200 generates bitmap data. However, the control unit 70 of the three-dimensional modeling apparatus 100 may perform such processing.

Here, the number of colors that can be expressed in accordance with the discharge amount of ink and the number of unit grilles in the depth direction will be described.

Figure 7:
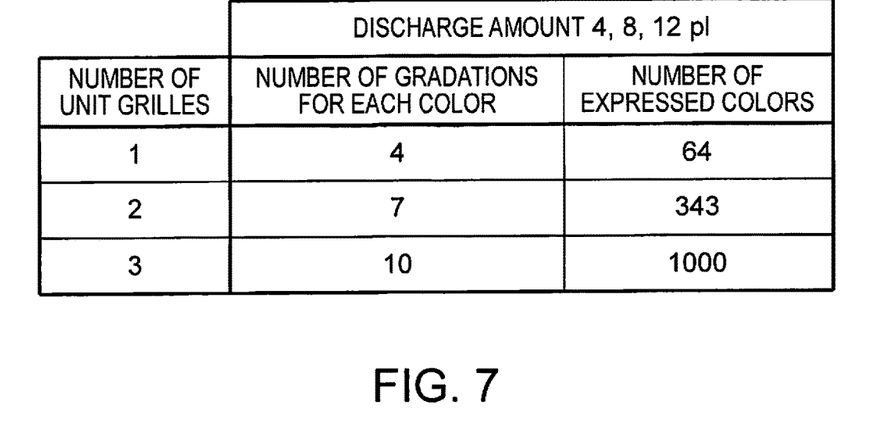
FIG. 7 is a diagram showing the number of colors that can be expressed in the case where a discharge amount of ink per droplet can be adjusted to one of 4 pl, 8 pl and 12 pl.

FIG. 7 is a diagram showing the number of colors that can be expressed in the case where the discharge amount of ink per droplet can be adjusted to one of 4 pl, 8 pl, and 12 pl. In the case where the discharge amount of ink per droplet to be discharged by the head unit 50 can be adjusted to one of 4 pl, 8 pl, and 12 pl as in the above embodiment, with the use of three unit grilles aligned in the depth direction, 1000 colors in total can be expressed based on the colors each having 10 gradations. In addition, even in the case of using two unit grilles aligned in the depth direction, 343 colors in total can be expressed based on the colors each having seven gradations (0 pl, 4 pl, 8 pl, 12 pl, 16 pl, 20 pl, and 24 pl). Note that if the number of unit grilles is one, 64 colors in total can be expressed for all of C, M and Y based on the colors each having four gradations as described in the first embodiment.

Figure 8:
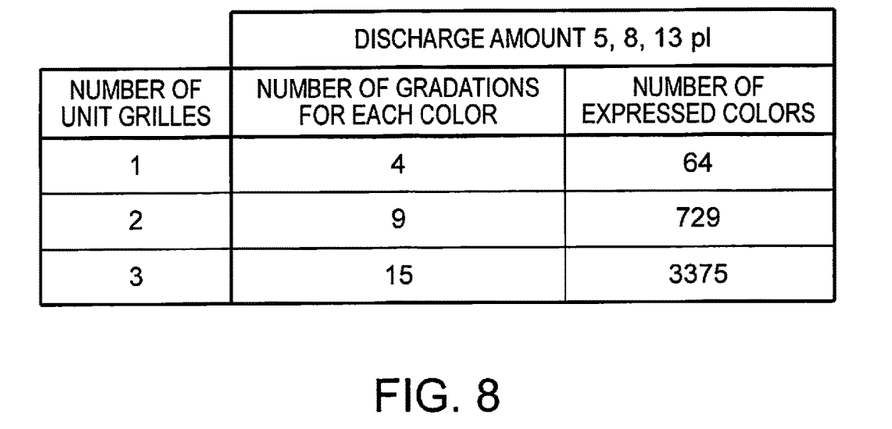
FIG. 8 is a diagram showing the number of colors that can be expressed in the case where a discharge amount of ink per droplet can be adjusted to one of 5 pl, 8 pl and 13 pl.

FIG. 8 is a diagram showing the number of colors that can be expressed in the case where the discharge amount of ink per droplet can be adjusted to one of 5 pl, 8 pl, and 13 pl. In the case where the discharge amount of ink per droplet to be discharged by the head unit 50 can be adjusted to one of 5 pl, 8 pl, and 13 pl, even if the number of unit grilles is two, 729 colors in total can be expressed for all of C, M and Y based on the colors each having nine gradations (0 pl, 5 pl, 8 pl, 10 pl, 13 pl, 16 pl, 18 pl, 21 pl, and 26 pl), as shown in FIG. 8. If the number of unit grilles is three, 3375 colors can be expressed for all of C, M and Y based on the colors each having 15 gradations. This is because in the case where the discharge amount of ink per droplet is 5 pl, 8 pl, or 13 pl, the values of the discharge amounts are not in a multiplicative relationship, and therefore it is possible to combine the discharge amounts in various manners in a unit grille column UC. That is, if the combined discharge amounts of ink are not in a multiplicative relationship, finer gradation expression can be performed. Note that such a relation is not limited to the combination of 5 pl, 8 pl and 13 pl, and it is sufficient that the head unit 50 can discharge each of the types of chromatic ink at least in a first amount and in a second amount that is larger than the first amount, and the second amount is an amount that is not a multiple of the first amount.

C. Third Embodiment

Figure 9:
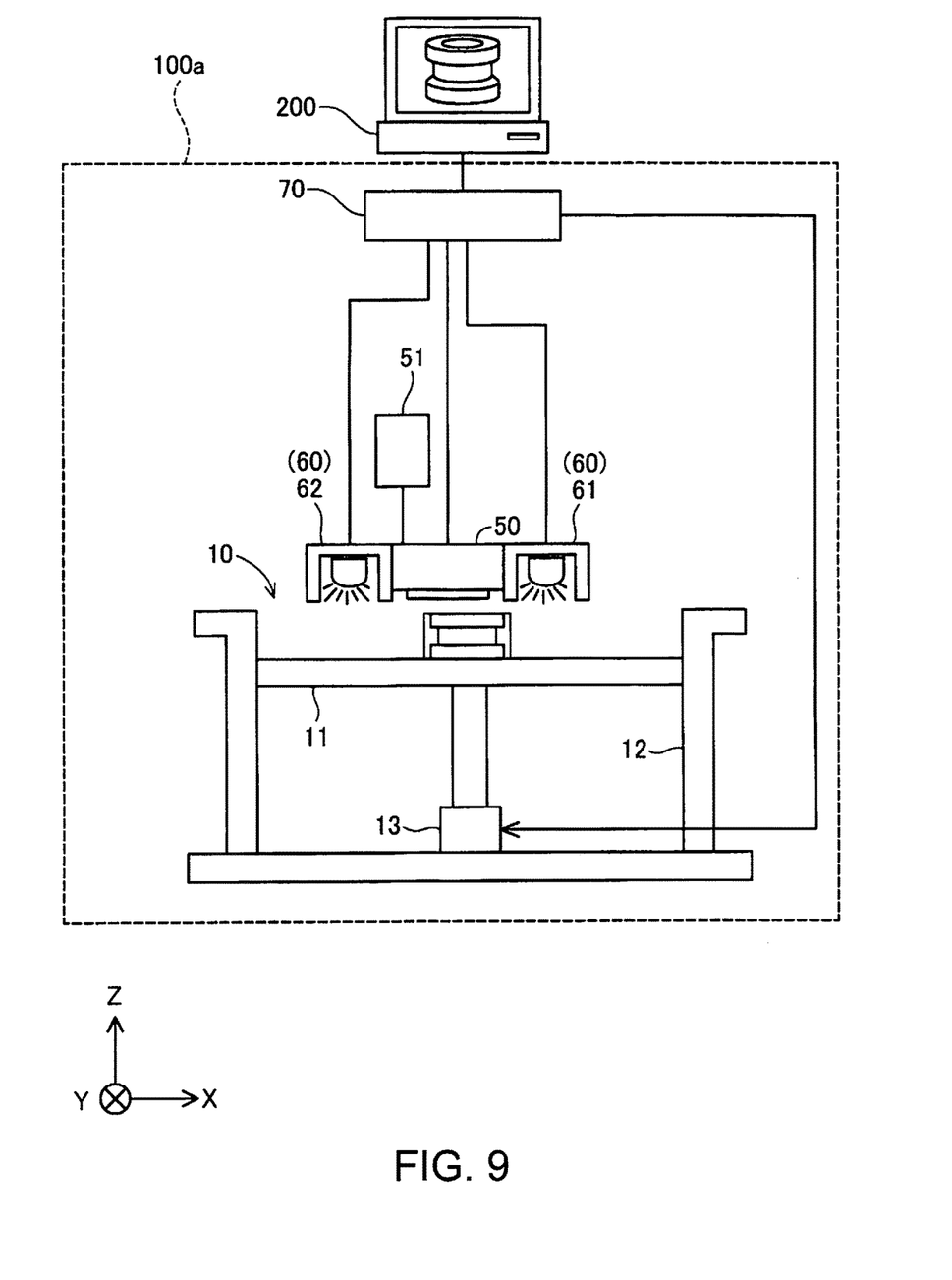
FIG. 9 is an explanatory view showing a schematic configuration of a three-dimensional modeling apparatus in a third embodiment.

FIG. 9 is an explanatory diagram showing the schematic configuration of a three-dimensional modeling apparatus in a third embodiment. The three-dimensional modeling apparatus 100 of the first embodiment models a three-dimensional object by discharging a curable liquid onto powder supplied into the modeling unit 10. On the other hand, a three-dimensional modeling apparatus 100a of the third embodiment models a three-dimensional object using only a curable liquid containing resin without using powder.

The three-dimensional modeling apparatus 100a is provided with the modeling unit 10, the head unit 50, the curing energy applying unit 60 and the control unit 70. The modeling unit 10 is provided with the modeling stage 11, the frame body 12 and the actuator 13 similarly to the first embodiment. However, the frame body 12 may be omitted. The tank 51 is connected to the head unit 50. The curing energy applying unit 60 is provided with the main curing light emitting apparatus 61 and the provisional curing light emitting apparatus 62. That is, the three-dimensional modeling apparatus 100a has many portions in common with the configuration of the three-dimensional modeling apparatus 100 of the first embodiment, and has a configuration in which the powder supply unit 20, the flattening mechanism 30 and the powder collecting unit 40 are omitted from the three-dimensional modeling apparatus 100 of the first embodiment. Such a three-dimensional modeling apparatus 100a can also model a three-dimensional object by the same processing as that of the three-dimensional modeling apparatus 100 of the first embodiment, except for the processing for forming a powder layer. Note that in the case of this embodiment, chromatic ink and achromatic ink are discharged into the spatial volume of a sub unit grille SU such that the volume of the discharged ink is substantially the same as the volume of the sub unit grille SU.

D. Modified Examples

Modified Example 1

In the case where the cure shrinkage rates of chromatic ink and achromatic ink are different, even if the volumes of the ink (discharge amounts) when being discharged from the head unit 50 are the same, the volumes after curing vary. Therefore, in the above embodiment, the discharge amount of at least one of the chromatic ink and clear ink is preferably adjusted in advance in accordance with the difference in the cure shrinkage rates.

Figure 10:
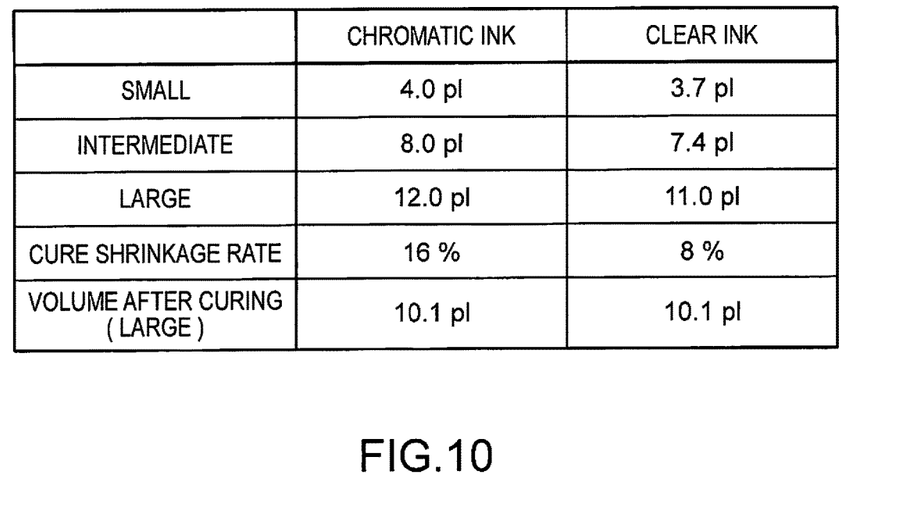
FIG. 10 is a diagram showing an example in which a discharge amount of clear ink has been adjusted.

FIG. 10 is a diagram showing an example in which the discharge amount of clear ink has been adjusted. As shown in FIG. 10, for example, in the case where the cure shrinkage rate of chromatic ink is 16% and the cure shrinkage rate of the clear ink is 8%, when discharging a "small", "intermediate" or "large" amount of clear ink, the control unit 70 causes the clear ink to be discharged from the head unit 50 in an amount smaller than the same amount of the chromatic ink by 8%. Accordingly, the volumes of the chromatic ink and the clear ink after curing and shrinking can be uniformized, and modeling accuracy of a three-dimensional object can be improved. Of course, the control unit 70 may adjust the discharge amount of the chromatic ink based on the cure shrinkage rate of the clear ink.

Modified Example 2

In the above embodiments, the gradation of each color is expressed in units of a unit grille UG or a unit grille column UC. If area gradation is further combined therewith, an apparent resolution can be further enhanced.

Modified Example 3

In the above embodiments, the three-dimensional modeling apparatus 100 colors the outermost periphery of a three-dimensional object, but clear ink for protecting a colored portion may be discharged onto the outer peripheral side of the colored portion.

Modified Example 4

In the above embodiments, the head unit 50 moves relatively in the Z direction by the modeling stage 11 moving in the Z direction. However, the position of the modeling stage 11 may be fixed and the head unit 50 may be moved directly in the Z direction. In addition, the head unit 50 moves in the X direction and the Y direction in the above embodiments, but the position of the head unit 50 may be fixed in the X direction and the Y direction, and the modeling stage 11 may be moved in the X direction and the Y direction.

Modified Example 5

In the above embodiments, out of three-dimensional modeling processes shown in FIGS. 2 and 5, the processes of steps S10 to S30 are executed by the computer 200. However, those processes may be executed by the three-dimensional modeling apparatus 100. That is, the three-dimensional modeling apparatus 100 may execute all of the processes from the acquisition of polygon data to the modeling of a three-dimensional object by itself. In addition, in the above embodiments, the process of step S40 shown in FIGS. 2 and 5 is executed by the control unit 70 of the three-dimensional modeling apparatus 100. However, the process of step S40 may be executed by the computer 200 controlling the units of the three-dimensional modeling apparatus 100. That is, the computer 200 may perform the functions of the control unit 70 of the three-dimensional modeling apparatus 100.

The invention is not limited to the above embodiments, examples, and modifications, and can be achieved in various configurations without departing from the gist of the invention. For example, the technical features in the embodiments, examples, and modifications corresponding to the technical features in the modes can be replaced or combined as appropriate in order to solve some or all of the problems described above, or in order to achieve some or all of the aforementioned effects. Technical features that are not described as essential in the specification can be deleted as appropriate.

The entire disclosure of Japanese patent No. 2015-041031, filed Mar. 3, 2015 is expressly incorporated by reference herein.

What is claimed is:

1. A three-dimensional modeling apparatus for modeling a three-dimensional object by laminating a plurality of cross section bodies in a Z direction, the three-dimensional modeling apparatus comprising:
   a head unit that models the object by discharging a liquid that is to be a material of the object into each unit grille that is defined in accordance with a modeling resolution of the cross section body in an X direction, a modeling resolution of the cross section body in a Y direction, and a lamination interval of the cross section body in the Z direction; and
   a control unit that controls the head unit,
   wherein the unit grille has a plurality of sub unit grilles aligned in the Z direction,
   the head unit is configured to individually discharge, into each of the sub unit grilles, an achromatic liquid and a plurality of types of chromatic liquids in designated amounts, and
   in a case where a designated amount of one of the plurality of types of chromatic liquids is discharged into each of the sub unit grilles by controlling the head unit and the spatial volume of the sub unit grille is not filled, the control unit causes the achromatic liquid to be discharged into the sub unit grille in addition to the chromatic liquid so as to fill the spatial volume of the sub unit grille.

2. The three-dimensional modeling apparatus according to claim 1,
   wherein the control unit expresses color gradation represented by one of the plurality of types of chromatic liquids by changing the number of unit grilles into which the one chromatic liquid is to be discharged, with respect to a unit grille column that is constituted by a plurality of unit grilles aligned in a direction inwardly from a surface of the object.

3. The three-dimensional modeling apparatus according to claim 2,
   wherein in a case where a plurality of the unit grilles into which the one chromatic liquid is to be discharged exist in the unit grille column,
   the control unit discharges the one chromatic liquid into the sub unit grilles whose positions in the Z direction are the same in the plurality of unit grilles, and
   discharges the one chromatic liquid into each of the sub unit grilles in the unit grille column such that the one chromatic liquid is arranged on the surface side relative to the achromatic liquid.

4. The three-dimensional modeling apparatus according to claim 3,
   wherein the color of the achromatic liquid is white.

5. The three-dimensional modeling apparatus according to claim 3,
   wherein the head unit is configured to discharge each of the plurality of types of chromatic liquids in at least a first amount and a second amount that is larger than the first amount, and
   the second amount is not a multiple of the first amount.

6. The three-dimensional modeling apparatus according to claim 1,
   wherein the amount of the achromatic liquid that is discharged from the head unit into the sub unit grilles is adjusted in advance in accordance with the difference between a cure shrinkage rate of the achromatic liquid and a cure shrinkage rate of each of the chromatic liquids.

7. A method for manufacturing a three-dimensional object using a three-dimensional modeling apparatus for modeling a three-dimensional object by laminating a plurality of cross section bodies in a Z direction,
   the three-dimensional modeling apparatus including a head unit that models the object by discharging a liquid that is to be a material of the object into each unit grille that is defined in accordance with a modeling resolution of the cross section body in an X direction, a modeling resolution of the cross section body in a Y direction, and a lamination interval of the cross section body in the Z direction, and
   the unit grille having a plurality of sub unit grilles aligned in the Z direction, the head unit being configured to individually discharge, into each of the sub unit grilles, an achromatic liquid and a plurality of types of chromatic liquids in designated amounts, the method comprising, in a case where a designated amount of one of the plurality of types of chromatic liquids is discharged into each of the sub unit grilles by controlling the head unit and the spatial volume of the sub unit grille is not filled, discharging the achromatic liquid into the sub unit grille in addition to the chromatic liquid so as to fill the spatial volume of the sub unit grille.

8. A non-transitory computer-readable medium for manufacturing a three-dimensional object by causing a computer to control a three-dimensional modeling apparatus for modeling a three-dimensional object by laminating a plurality of cross section bodies in a Z direction, the three-dimensional modeling apparatus including a head unit that models the object by discharging a liquid that is to be a material of the object into each unit grille that is defined in accordance with a modeling resolution of the cross section body in an X direction, a modeling resolution of the cross section body in a Y direction, and a lamination interval of the cross section body in the Z direction, and the unit grille having a plurality of sub unit grilles aligned in the Z direction, the head unit being configured to individually discharge, into each of the sub unit grilles, an achromatic liquid and a plurality of types of chromatic liquids in designated amounts, the non-transitory computer-readable medium causing the computer to function such that, in a case where a designated amount of one of the plurality of types of chromatic liquids is discharged into each of the sub unit grilles by controlling the head unit and the spatial volume of the sub unit grille is not filled, the achromatic liquid is discharged into the sub unit grille in addition to the chromatic liquid so as to fill the spatial volume of the sub unit grille.

* * * * *